April 1, 1958
G. L. COTTER
2,829,011
FLUID PRESSURE BRAKE APPARATUS
Filed Nov. 17, 1953
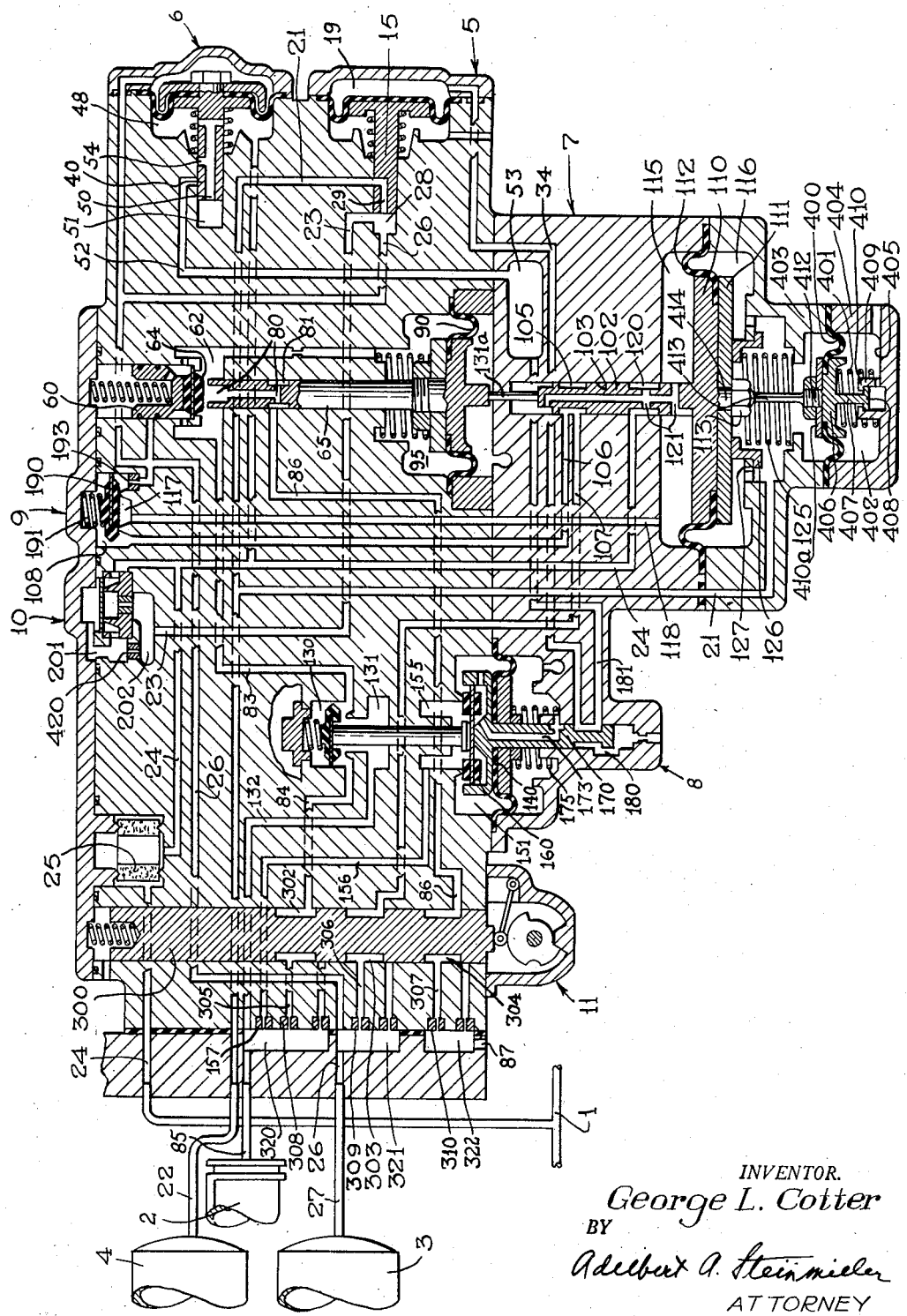
INVENTOR.
George L. Cotter
BY
Adelbert A. Steinmiller
ATTORNEY : 2,829,011
Patented Apr. 1, 1958

2,829,011
FLUID PRESSURE BRAKE APPARATUS

George L. Cotter, Pittsburgh, Pa., assignor to Westinghouse Air Brake Company, Wilmerding, Pa., a corporation of Pennsylvania Application November 17, 1953, Serial No. 392,634

2 Claims. (Cl. 303—64)

This invention relates to fluid pressure brake apparatus and more particularly to fluid pressure brake apparatus of the graduated release type adapted to be employed on European railways and such as disclosed in United States patent application, Serial No. 387,382, of Glenn T. McClure, John W. Rush and Earle S. Cook, filed October 21, 1953, now Patent No. 2,785,933, and assigned to the assignee of the present application.

In the brake apparatus disclosed in the above-identified application, initial charging of the auxiliary and control reservoirs is effected exclusively by supply of fluid under pressure from an overcharged brake pipe by way of a certain flow restricting choke which allows said reservoirs to become fully charged to a normal value within a given period of time, such as three minutes, for example. Thereafter, due to the excessive size of such choke necessary to permit full charging of the auxiliary and control reservoirs within the allotted time, during the continued existence of overcharge pressure in said brake pipe, fluid under pressure will continue to flow therefrom to said reservoirs via said choke at an undesirably rapid rate as these reservoirs are thus caused to become overcharged.

The prime object of the invention is to provide a fluid pressure brake apparatus of the above type with improved means for controlling initial charging of the auxiliary and control reservoirs whereby same may be fully charged to a normal value within the allotted time, while greatly reducing the degree of overcharge which said reservoirs will realize within any given time during the continued existence of an overcharged brake pipe.

Other objects and advantages of the invention will become apparent from the following more detailed description thereof.

In the accompanying drawing, the single figure is a schematic representation of a fluid pressure brake apparatus embodying the invention.

Description

The invention may be incorporated in any of the European type brake apparatuses which employ a service valve device having a retarded recharge control portion which regulates admission of fluid under pressure from the brake pipe to the input of a spring-loaded charging check valve in a supply communication to the auxiliary reservoir during initial charging of the apparatus, and in which apparatus there is in existence a communication connecting the auxiliary reservoir with the control reservoir during such initial charging.

For sake of simplification, however, I prefer to show and describe my invention by way of example as same is incorporated in the fluid pressure brake apparatus disclosed in the previously identified patent application. In view of the detailed disclosure of such apparatus as set forth in the aforementioned application, reliance herein will be placed upon such application for the detailed descriptions of the components and a general understanding of the operation of the apparatus disclosed therein. Wherein the parts, passages, devices etc. of the present application are pertinent to the invention and correspond to the showing in the previous patent application, such parts etc. will be designated by the same reference numerals.

Briefly, the apparatus in which the invention is shown incorporated includes a charging valve device 5 which assumes a charging position during initial charging of the apparatus to connect auxiliary and control reservoirs 3 and 4 one with the other and to a brake pipe 1; the valve device 5 in its charging position having a valve 15 positioned to connect an auxiliary reservoir chamber 28 to both a control reservoir passage 21 and to a brake pipe passage 23. The auxiliary reservoir chamber 28 is constantly open to the auxiliary reservoir 3 by way of a passage 26, a header chamber 321, and a pipe 27. The control reservoir passage 21 is in constantly open communication with a control reservoir pressure chamber 116 in the service valve device 7 via the passage 21 and with the control reservoir 4 via said passage 21 and a pipe 22. The brake pipe passage 23 is in constantly open communication with the brake pipe 1 by way of a chamber 202 in device 10, an initial charge limiting choke 420, a chamber 201 in said device 10, a passage 24, and an air strainer 25.

The charging valve device 5 in the fluid pressure brake apparatus as disclosed in the previously identified patent application is adapted to assume a charging cut-off position, responsively to pressurization of its control chamber 19, in which position the slide valve 15 will disestablish registry between brake pipe passageway 23 and chamber 28 and will disestablish registry between passageways 29 and 21; thereby closing off the auxiliary and control reservoirs 3 and 4 one from the other and each from the brake pipe 1.

In the apparatus as disclosed in the aforementioned patent application, the control chamber 19 in the charging valve device 5 is arranged to be pressurized during initiation of a brake application by supply of fluid under pressure thereto from the brake pipe 1 via the usual quick service valve device 6 comprised in such apparatus, and is arranged to be maintained pressurized during existence of a brake application by fluid under pressure from the brake cylinder device 2 via a device 8 which establishes communication between said control chamber 19 and the quick service valve device 6 or the brake cylinder device 2 responsively to pressurization and depressurization, respectively, of the brake cylinder device. The communication whereby the control chamber 19 in the charging valve device 5 is initially pressurized from the brake pipe 1 during the initiation of a brake application includes the brake pipe passageway 24, chamber 48 in quick service valve device 6, the passageway 50 and port 51 in the slide valve 40 of said device 6, when in its quick service position opposite to that in which it is shown in the drawing, the passageway 52, quick service volume 53, the passageway 181, groove 180 in slide valve 170 in the device 8, and a passageway 34. Upon attainment of a certain brake cylinder pressure in chamber 155 in device 8, same will respond to effect movement of its valve 170 to a position for disconnecting passageway 34 from passageway 181 and connecting said passageway 34, hence chamber 19 in device 5, to the brake cylinder device 2 via a port and passageway 173 in said valve 170, chambers 151 and 155 in said device 8, passageway 156, a stabilizing choke 157, the header chamber 320, and the pipe 85. Subsequently, during release of fluid under pressure from the brake cylinder device 2, reduction in brake cylinder pressure in chamber 151 acting on diaphragm 140 in device 8 will permit spring 175 to return slide valve 170 to its position for reconnecting passageways 34 and 181 via the groove 180, 2,829,011

3

The service valve device 7 as disclosed in the aforementioned patent application comprises diaphragms 112, 90, interconnected via a slide valve 102 and stem 131a, and operatively connected to a release valve seat element 65 in association with a release valve 64 and attached supply valve 60, for selectively establishing a brake cylinder supply communication, a brake cylinder release communication, or closure of both communications according to whether brake cylinder pressure as experienced in chamber 95 is deficient, in excess of, or commensurate with, respectively, the degree of disparity between brake pipe pressure in chamber 115 with respect to control reservoir pressure in chamber 116. For example, the service valve device 7 will respond to reduction in brake pipe pressure relative to control reservoir pressure to establish such supply communication from the auxiliary reservoir 3 to the brake cylinder device 2 until brake cylinder pressure has been increased to a value in accord with the degree of such brake pipe pressure reduction. The supply communication as disclosed in the aforementioned patent application extends between the auxiliary reservoir 3 and the brake cylinder device 2 and includes the pipe 27, passageway 26, the chamber 62 in device 7, and a brake cylinder communication including a passageway 83, the chamber 130 in inshot valve device 8, and such as the passageway 84, groove 302 in valve 300 of service selector valve device 11, passageway 305, choke 308, header chamber 320, and pipe 85. The brake cylinder release communication extends between the brake cylinder device 2 and the atmosphere and includes the brake cylinder communication traced above, the chamber 62, in device 7, passageway 80 and groove 81 in seat element 65 of device 7, and an exhaust communication including a passageway 86, groove 304 in valve 300 of service selector valve device 11, port 87, header chamber 322 and such as choke 310 and passageway 307.

The apparatus further includes a retarded recharge portion of the service valve device 7, which portion comprises a slide valve 102 operably attached to a diaphragm 112 exposed to pressure of fluid in a pressure chamber 115 at one side and to pressure of fluid in the control reservoir pressure chamber 116 at its opposite side. A movable stop element 126 is also included which is urged toward its repose position, seated against a fixed stop 127, by a retarded recharge control spring 125.

In the release position of the service valve device 7, in which it is shown in the drawing and in which position it will be during begining of initial charging of the brake apparatus, a diaphragm follower member 111 attached to diaphragm 112 is in contact with the movable stop 126 which in turn is in contact with the fixed stop 127, while the slide valve 102 is positioned for immediate registry of the uppermost end of its groove 120 with the port end of brake pipe passage 24 for communication of said passage with pressure chamber 115 and thereby a reservoir charging passage 118 via passage and ports 121 in said slide valve.

Still further, the equipment in which the invention is shown incorporated includes also an auxiliary reservoir charging check valve device 9 which comprises a check valve 190 loaded by a spring 191 to control communication between an input chamber 117 and an output chamber 108; the chamber 117 being in constantly open communication with the reservoir charging passage 118, while the chamber 108 is in constantly open restricted communication with the auxiliary reservoir 3 by way of an auxiliary reservoir maintenance choke 193, the passage 26 and a pipe 27, and said chamber 108 is also in relatively unrestricted communication with said auxiliary reservoir during initial charging of the brake equipment by way of a passage 106, a groove 105 in slide valve 102 of the service valve device 7, a passage 107, a groove 303 in valve 300 in a service selector valve device 11, the header chamber 321 and said pipe 27.

According to the invention, the means incorporated in

4 the brake equipment to provide the desirable feature of rapid initial charging without jeopardy of overcharge protection in addition to choke 420 comprises a flexible diaphragm 400 subject opposingly to pressure of fluid in the control reservoir pressure chamber 116 in the service valve device 7 at its one side and at its opposite side to the force of a compression spring 401 in a non-pressure chamber 402. The diaphragm 401 is preferably clamped between a portion of the casing 403 of the service valve device 7 and a casing member 404 suitably shaped to form the chamber 402 and accommodate disposition of the spring 401.

The spring 401 is interposed between an end wall 405 of the casing 404 and an accommodating face of a diaphragm follower member 406 attached for movement with the central portion of the diaphragm 400.

Disposed in the chamber 402 in encirclement by the spring 401 there is a stem 407 integrally attached at its one end to the diaphragm follower member 406, while its opposite end is provided with a flanged portion 408 slidably guided within a fixed cylindrical element 409 secured to the casing 404.

The spring 401 urges the follower member 406 and thereby diaphragm 400 in the direction of chamber 116 toward a stop position, in which it is shown in the drawing, defined by engagement of the flanged portion 408 of stem 407 with a radially inward projecting annular stop member 410 attached to the projecting end of element 409.

Disposed in the control reservoir pressure chamber 116 at the opposite side of the diaphragm 112 there is an annular diaphragm follower member 410a which is clamped to the diaphragm 400 through the medium of a nut 411 in screw-threaded attachment with a threaded central portion 412 of the follower member 406 which extends through a central opening in the diaphragm 400 and the center of follower member 410 into the chamber 116. Also shown disposed in the control reservoir pressure chamber 116 there is a stem 413 which is integrally attached at its one end to the diaphragm follower member 406 as an extension of portion 412 thereof and which is thereby secured for movement with deflection of the diaphragm 400. The length of stem 413 is such that its opposite end abuts a projecting stud bolt portion 414 of the diaphragm follower member 110 of the service valve device 7 when in the brake release position in which it is shown in the drawing and the diaphragm 400 is in the position in which it also is shown in the drawing.

*Operation*

Assume that all parts of the equipment are in the positions in which they are shown in the drawing, with the auxiliary and control reservoirs 3 and 4 and all connected chambers devoid of fluid under pressure, and that it is desired to initially charge said reservoirs within an allotted period of time such as three minutes. As will be appreciated from the disclosure of operation of the equipment as set forth in the previously identified patent application, fluid under pressure will be supplied to the brake pipe 1 to the extent of overcharge pressurization and such fluid under pressure thence will flow via brake pipe passage 24 to the chamber 201 in the overcharge check valve device 10 and simultaneously to the brake pipe pressure chamber 115 in the service valve device 7 via groove 120 in valve 102 and the port and passage 121.

According to the invention, at the beginning of initial charging of the apparatus, in the service valve device 7, deflection of the diaphragm 112 in the direction of the control reservoir pressure chamber 116 is opposed by both the spring 125 via movable stop 126 and the spring 401 via follower member 406, stem 413, stud bolt 414 and follower member 110 clamped to said diaphragm. Fluid under pressure from the overcharged brake pipe passage 24 is thus permitted to flow into the brake pipe pressure chamber 115 at a rate which will predominate over pressure of fluid in the control reservoir pressure chamber 116 to the extent of ten pounds, for example, as the diaphragm 112 deflects in opposition to the two springs 125 and 401 to operate slide valve 102 and thereby so position the uppermost end of groove 120 as will regulate admittance of fluid under pressure from passage 24 into chamber 115 to prevent preponderance in brake pipe pressure in said chamber 115 over control reservoir pressure in chamber 116 to any greater extent.

Such controlled preponderance in pressure of fluid in chamber 115, the ten pounds chosen for example, over control reservoir pressure in chamber 116, in accord with the prime feature of the invention, is ample to cause a relatively rapid rate of flow of fluid under pressure from the chamber 115 in the service valve device 9 through the charging passage 118, to the chamber 117 in the charging check valve device 9 where such pressure will be sufficient to maintain check valve 190 unseated against opposition of its one and seven-tenths pounds spring 191 for simultaneous flow at a rapid rate to the auxiliary reservoir 3 via passage 106, groove 105 in valve 102 in service valve device 7, passage 107, groove 303 in valve 300 of device 11, passage 306, choke 309, header chamber 321, passage 26 and pipe 27, and to the control reservoir 4 via said passage 26, chamber 28 and passage 29 in valve 15 of the charging valve device 5, passage 21 and pipe 22.

By virtue of the modified action of the service valve device 7 under influence of the additional spring 401 as above described, and by virtue of the fact that the auxiliary and control reservoirs are charged simultaneously via the same passage 26, with their pressures at any moment consequently substantially equal, it will be appreciated that so long as the service valve device 7 maintains a pressure in chamber 115 of device 7, hence in chamber 117 in device 9, greater than one and seven-tenths pounds above control reservoir pressure, hence auxiliary reservoir pressure, such rapid charging of the two reservoirs 3 and 4 by way of charging check valve device 9 as above described will continue.

At the same time, acting in assist to the charging of the auxiliary and control reservoirs 3 and 4, there will be a greatly restricted flow at a trickle rate from the brake pipe passage 24 to said reservoir by way of chamber 201, choke 420 and chamber 202 in device 10, passage 23 and chamber 28 in the charging valve device 5, and there also may be a greatly restricted flow at a trickle rate from the chamber 108 in charging check valve device 9 to said reservoirs via choke 193, passage 26 and chamber 28 in the charging valve device 5, which trickle flows will not materially influence the rate of initial charging of said reservoirs during flow thereto via the spring-loaded check valve 190.

As the control reservoir pressure, hence auxiliary reservoir pressure, as realized in the control reservoir pressure chamber 116 in the service valve device 7 is thus caused to increase at a relatively rapid rate during initial charging of the apparatus, such pressure in acting on the diaphragm 400 will increasingly oppose the action of spring 401 on the diaphragm 112 in the service valve device 7, thereby making it progressively easier for said diaphragm 112 to deflect in the direction of chamber 116 and cause valve 102 to close off chamber 115, hence chamber 117 in device 9, from the brake pipe passage 24. The degree of preponderance in pressure in the chambers 115 and 117 over the control reservoir pressure in chamber 116 is therefore progressively reduced as the increasing control reservoir pressure in chamber 116 in acting on diaphragm 400 reduces the effectiveness of action of the spring 401 on the diaphragm 112 assemblage. When the control reservoir pressure attains a certain value, such as sixty-five pounds, which is substantially its full normal charge value of such as seventy or seventy-one pounds, the effectiveness of the spring 401 will be reduced to the extent that pressure of fluid in chambers 115 and 117 will no longer be effective to unseat the spring-loaded check valve 190 in device 9, and the relatively unrestricted rapid charging flow to the auxiliary and control reservoirs 3 and 4 via said check valve as aforedescribed will terminate.

Thereafter, continued initial charging of the auxiliary and control reservoirs 3 and 4 from the brake pipe passage 24 to raise their pressure from the sixty-five pounds value to the full seventy-one pounds, or full normal charge value, occurs exclusively by way of the chambers 201, 202 and the choke 420 in the check valve device 10, passage 23, and the chamber 28 in the charging valve device 5 thence via passages 26 and 21 as aforedescribed. Such final reservoir charging flow in being subjected to the restrictive action of the choke 420 will occur at a trickle rate which reduces the degree of overcharge the auxiliary and control reservoirs 3, 4 might realize in any given time under influence of the prolonged overcharged condition in the brake pipe passage after full normal charge pressure in said reservoirs has been established.

It should also be pointed out that while the control reservoir pressure is at its full normal value, as same will be during operation of the apparatus subsequent to its being initially charged, the spring 401 will be kept totally ineffective by action of such pressure in chamber 116 on diaphragm 400 which will be deflected to the extent as permitted by engagement of flanged portion 408 of stem 407 on casing wall 405 with stem 413 out of engagement with stud portion 414 of follower member 110. The spring 125 alone will then be effective to provide the retarded recharge feature of service valve device 7 as described in the aforementioned patent application to limit pressure of fluid in chamber 115 to a value less than seven-tenths of a pound, for example, above the control reservoir pressure in chamber 116.

*Summary*

From the foregoing it will be apparent that I have provided means which, when incorporated in a European type of brake equipment comprising a service valve device having the retarded recharge control portion, will provide for substantial charging of the auxiliary and control reservoirs in said equipment to nearly full normal pressure in a short time, and which will function to automatically restrict continued admission of fluid under pressure from the brake pipe to said reservoirs for full realization of their normal full charge value within an allotted time while reducing the degree of overcharge said reservoirs may experience during a given period of continuation of an overcharge condition in said brake pipe after full normal charging of said reservoirs.

Having now described the invention, what I claim as new and desire to secure by Letters Patent, is:

1. In a fluid pressure brake apparatus, in combination, a brake pipe, a brake cylinder device, an auxiliary reservoir, a control reservoir, brake controlling means responsive to variations in brake pipe pressure relative to control reservoir pressure to control supply of fluid under pressure from said auxiliary reservoir to said brake cylinder device, spring-loaded check valve means having an inlet for communication with a source of fluid under pressure and having an outlet connected to said auxiliary reservoir, a restricted charging supply conduit connected to said brake pipe, a fluid pressure operable valve device normally establishing communication between the control and auxiliary reservoirs and between said reservoirs and said restricted charging supply conduit and operable by fluid under pressure to a cut-off position to close both communications, a first chamber open to said inlet, a second chamber open to said control reservoir independently of said valve device, valve means operable to control fluid pressure communication from said brake pipe to said first chamber and to said inlet, movable abutment means operative responsively to preponderance in pressure of fluid in said first chamber over pressure of fluid in said second chamber to actuate said valve means to restrict the degree of opening of said brake pipe to said first chamber and to said inlet according to the degree of such preponderance, bias means acting on said movable abutment means in assist to action of pressure of fluid in said second chamber to permit sufficient pressurization of said inlet for charging flow to the control and auxiliary reservoirs via said spring-loaded check valve means, and means operative to render said bias means ineffective responsively to increase in pressure of fluid in said second chamber above a certain value.

2. The combination as set forth in claim 1, including quick service control means operative responsively to a reduction in brake pipe pressure, less than that to which said brake controlling means will respond, to effect supply of fluid under pressure to said charging control means for causing same to assume its cut-off position.

References Cited in the file of this patent

UNITED STATES PATENTS

| | | |
|---|---|---|
| 1,919,423 | Farmer | July 25, 1933 |
| 1,926,146 | Ferring | Sept. 12, 1933 |
| 2,068,317 | Farmer | Jan. 19, 1937 |
| 2,707,134 | Cook | Apr. 26, 1955 |